May 5, 1964      H. Q. BAIR      3,131,598

INFLATABLE HATCH COVER FOR MILITARY TANK

Filed March 16, 1962      2 Sheets-Sheet 1

May 5, 1964

H. Q. BAIR 3,131,598

INFLATABLE HATCH COVER FOR MILITARY TANK

Filed March 16, 1962

United States Patent Office

3,131,598
Patented May 5, 1964

3,131,598
INFLATABLE HATCH COVER FOR
MILITARY TANK
Herbert Q. Bair, Tallmadge, Ohio, assignor to The B. F. Goodrich Company, New York, N.Y., a corporation of New York
Filed Mar. 16, 1962, Ser. No. 180,075
4 Claims. (Cl. 89—36)

The invention relates to inflatable shelters for mounting upon vehicles. More particularly, the invention relates to inflatable hatch covers for mounting upright over the driver-receiving openings or hatch openings in the front decks of military tanks to protect the drivers from the wind and weather.

Vehicles such as passenger cars and trucks are customarily provided with permanently attached, rigid wall compartments for protecting the drivers and/or cargo carried by the vehicles. For some applications, it is desirable that the protective compartments for the drivers or the cargo be of non-permanent character and be conveniently removable. An object of this invention is to provide an inflatable shelter comprising a windshield, a flexible covering, and inflatable tubular supporting means suitable for mounting over an opening in the vehicle body to protect the driver or the cargo or both, which inflatable shelter also includes means such, for example, as inflatable tubular attaching means permitting convenient, quick attachment and detachment of the shelter, when desired.

Military tanks have heretofore been provided with an access opening or hatch opening of desired configuration in plan in their front deck, which opening is generally closed by a removable rigid metal hatch cover of corresponding configuration. Also, the dimensions and configuration of the hatch opening of one design or model tank are generally not the same for a different design or model tank. When the metal hatch cover is removed, the driver of the tank can raise his seat so as to have his head and at least part of his torso extend through the hatch opening and above the deck for viewing more conveniently and completely the terrain over which the tank is traveling. However, this directly exposes the head and torso of the driver to the wind and the weather and this exposure is particularly objectionable, when the tank is being used in arctic and other regions under inclement weather conditions.

Accordingly, an object of the invention is to provide an inflatable shelter or hatch cover or hood adapted for use with different model tanks to protect the driver from adverse weather conditions and temperatures, when the rigid metal hatch cover is removed. The invention accomplishes this by the provision of an inflatable hatch cover or hood comprising a covering of flexible material connected to a rigid transparent windshield, inflatable tubular support means associated with the covering, and flexible attaching means such as inflatable tubular attaching means connected to the base of the hatch cover. This hatch cover or hood in the inflated condition of both said means is adapted to be maintained upright and mounted removably over the driver-receiving or hatch opening in the tank. The inflatable hatch cover in its inflated, mounted condition has minimum overall length, width and height to permit traverse and full depression of the tank's turret gun, yet accommodate the head and part of the torso of the driver, thereby protecting effectively the driver from the wind and inclement weather without objectionably hampering his vision, while he is guiding the tank over the terrain.

A related feature of the invention is the provision for deflection of the mounted hatch cover by virtue of localized deformation and bending of some or all the inflated tubular elements of the said supporting means of the said hatch cover, when the latter is upright and subjected to external localized force as by the impact of the gun barrel or of the bustle of the gun turret of the tank. This facilitates temporarily altering the normal shape and overall height of the mounted hatch cover which inherently resumes the said normal shape and overall height, when the said localized force is removed. Thus, traverse and maximum depression of the gun and full circle rotation of the gun turret are facilitated without objectionable interference by the hatch cover.

Further objects of the invention are to provide for fitting one particular size and shape of hatch cover to a range of sizes and shapes of access openings or hatches in different model tanks; to provide for simplicity of construction, convenience of manufacture and installation, and for effectiveness of operation.

These and other objects and advantages of the invention will be apparent from the following description.

In the accompanying drawings which constitute a part of this specification and in which like numerals are employed throughout to designate like parts:

Figure 3:
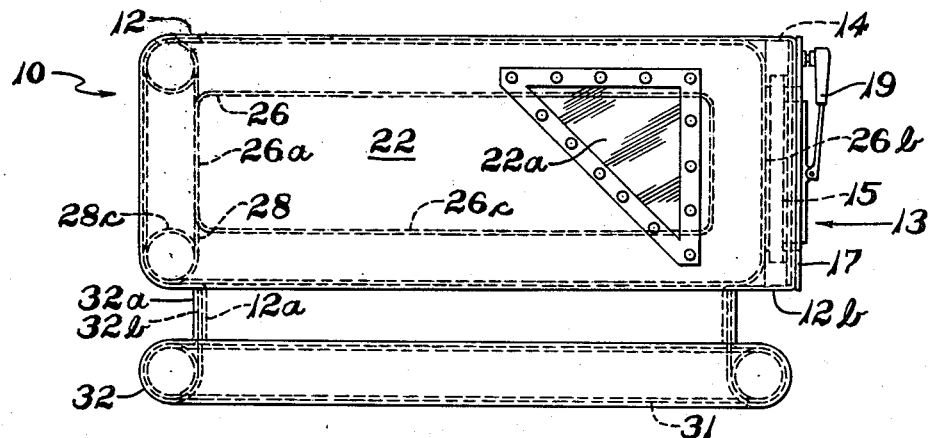
FIG. 3 is a side elevation of the inflatable hatch cover in its upright condition, the front deck not being shown.
Figure 2:
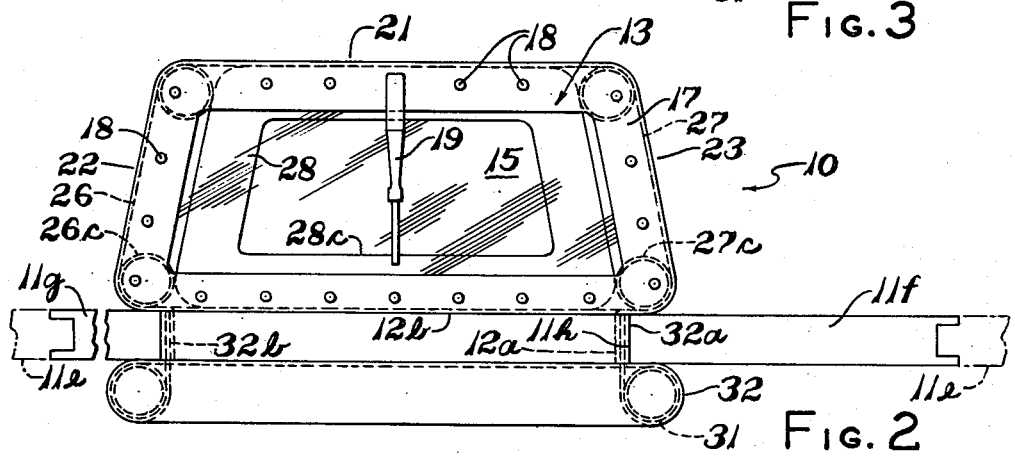
FIG. 2 is a front view of the inflatable hatch cover in its upright condition over the driver-receiving or hatch opening in the front deck which is shown in broken lines.

The inflatable shelter 10 for an opening in a vehicle body such, for example, as the hatch opening of a military tank 11 comprises a rigid windshield 13 of transparent material at the front of the inflatable shelter or hatch cover or hood, a covering 12 of flexible preferably fluid-tight material providing a roof portion 21 and dependent wall portions or panels 22, 23, 24 connected to the top and opposite sides or ends of the windshield, and inflatable tubular supporting means 25 including inflatable tubular sill elements disposed in supporting relation to each of the dependent wall portions of the covering and to opposite sides or ends of the windshield so as to maintain the covering and windshield upright over the hatch or driver-receiving opening. Flexible attaching means such, for example, as inflatable tubular attaching means 31 extends peripherally about and is connected, preferably in a flexible manner, to the base of the shelter or hatch cover 10 in spaced relation thereto, which inflatable attaching means, when distended by an inflating medium, engages the peripheral margin of the vehicle body or tank deck at the opening or hatch 11h therein. The flexible connection and spaced relationship of the attaching means to the base of the hatch cover accommodate variation in the dimensions of the hatch opening 11h and in the thickness of the tank deck at such opening. The construction and arrangement makes feasible quickly collapsing and removing the shelter or hatch cover 10 from over the said opening or hatch 11h, when the said inflatable supporting means 25 and attaching means 31 are each deflated. The hatch cover, except the rigid windshield, can then be compactly folded for storage purposes.

When the inflatable shelter 10 is utilized as a tank hatch cover disposed adjacent a gun turret 11a, the inflatable tubular supporting means 25 is inflated at a relatively low pressure such, for example, as in the order of about ½ lb. to 1 lb. per sq. in. gauge air pressure, although not necessarily limited thereto. This low pressure is generally sufficient to maintain the hatch cover in its normal upright disposition and normal shape, yet permit the desired localized deflection and bending of some or all of the tubes and also tilting of the windshield when the hatch cover is bumped as by the fully depressed gun barrel striking the windshield during traverse of the gun, or as by the bustle 11b of the gun turret 11a striking the back of the hatch cover during rotation of the turret. This bending facilitates altering the normal shape and overall height of the hatch cover so that the gun 11c barrel in its fully depressed position can sweep back and forth, i.e. traverse, or the turret bustle 11b can traverse the back of the hatch cover without damaging the latter. However, the hatch cover 10 quickly resumes its normal shape and upright position by virtue of the inherent return of the inflated tubes to their normal position so soon as the gun barrel passes beyond the hatch cover, or so soon as the bustle of the gun turret 11a passes beyond the hatch cover.

Figure 4:
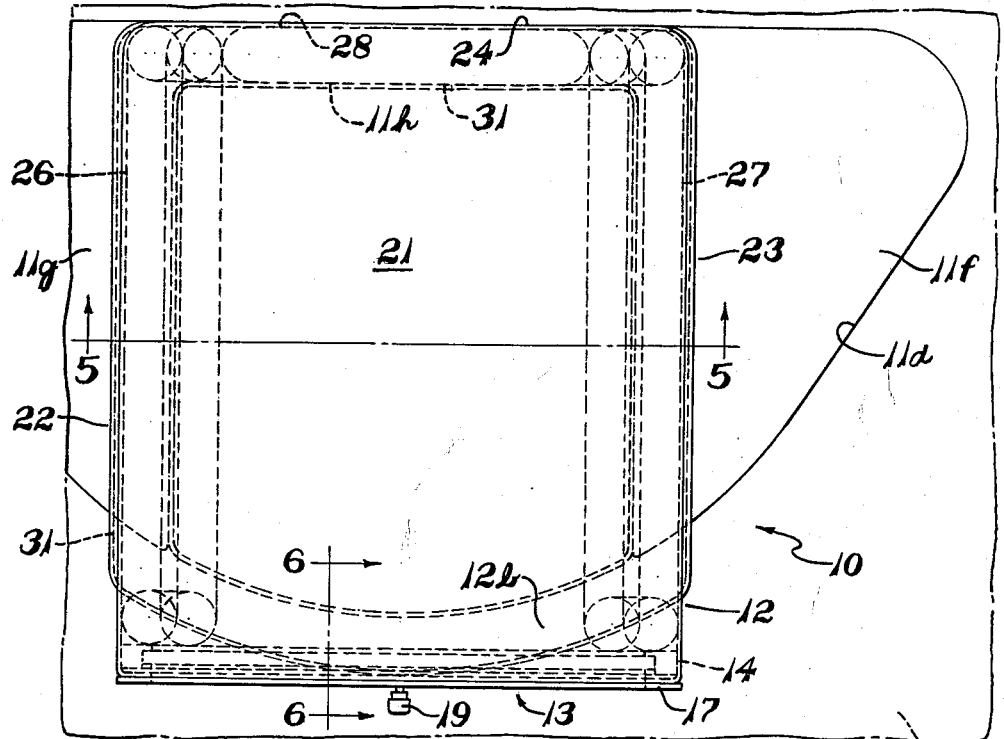
FIG. 4 is a top view of the inflatable hatch cover, the front deck being shown in broken lines.

The particular embodiment of the invention shown in the drawings is an inflatable hatch cover or hood 10 of generally rectangular configuration in plan for a military tank 11 which has a rotatable gun turret 11a with bustle 11b and gun or cannon 11c, the customary access opening 11d being in the front deck 11e adjacent the gun turret and being of a different shape in plan than that of the hatch cover 10. To fit the hatch cover 10 to the relatively large, differently shaped, for example, generally triangular, access opening 11d the latter is partially closed by removable side closure plugs 11f, 11g of suitable configuration in plan such, for example, as generally triangular, as shown in FIG. 4. These plugs 11f, 11g are removably attached to the front deck as by a tongue and groove arrangement and make possible providing a smaller and generally rectangular hatch opening 11h in the front deck over which the hatch cover 10 is mounted.

The construction of the inflatable hatch cover 10 includes a flexible covering 12 of preferably fluid-tight i.e. air and water impervious material such, for example, as square-woven textile fabric treated on one or both sides with a suitable natural rubber or synthetic rubber composition or other elastomeric plastic material having crack-resistant, abrasion-resistant and age-resistant characteristics. The inflatable hatch cover has at and extending across its front a rigid elongated windshield 13 of generally rectangular configuration in plan with rounded corners. The flexible covering 12 is connected to the top and the opposite sides or ends of the windshield 13 to provide a closed compartment for the driver's head and upper torso portion.

Figure 6:
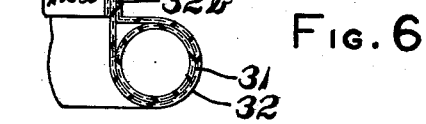
FIG. 6 is a sectional view of the inflatable hatch cover taken along line 6—6 in FIG. 4, the front deck not being shown.

The covering 12 is formed to provide with the windshield an open bottom hatch cover 10 having a length greater than the width and the height, the height being less than the width. This covering 12 has a flat roof portion 21 of generally rectangular configuration in plan united with dependent wall portions or panels 22, 23, 24 forming the back 24 wall or panel and two side 22, 23 walls or panels of the multi-sided hatch cover 10. The back wall 24 and the windshield 13 are substantially perpendicular to the front deck of the tank 11, when the hatch cover 10 is upright, but the side walls 22, 23 of the covering 12 and the sides or ends of the windshield 13 desirably flare from the flat roof 21 to the base of the hatch cover adjacent the front deck. Thus, the multi-sided hatch cover 10 has integral flexible roof 21, spaced substantially parallel opposed side walls 22, 23, and back wall 24, all of which are foldable for storage. Each side wall 22, 23 may be provided with a metal framed, triangular window 22a adjacent the windshield 13. As shown especially in FIG. 6, the covering 12 may be secured to the windshield in air and water-tight fashion by marginal portions clamped between the metal strips 16, 17.

The particular construction of rigid transparent windshield 13 except as to the provision of flared sides or ends and rounded corners, constitutes no part of the invention. For purposes described more fully hereinafter, the rounded upper corners of the rigid windshield 13 constitute camming surfaces adapted to contact the rounded outer surface of the fully depressed gun 11c during traverse of the latter. As shown in the drawings, the windshield has a rigid metal frame 14 and a glass panel 15 of the well-known laminated safety type which may incorporate known electrical heating means (not shown) for ice-removal purposes. The glass panel is secured to the frame 14 by a pair of continuous peripheral metal strips 16, 17 and a plurality of spaced screw fasteners 18. An oscillating windshield wiper 19 of known construction driven by an electrical motor 20 is mounted at the front of the windshield.

Inflatable tubular supporting means 25 are disposed within the hatch cover 10 in supporting relation to each of the dependent wall portions 22, 23, 24 of the flexible covering 12 and to the opposite, flared or sloping sides or ends of the windshield 13. The means 25, when inflated, normally maintains all portions of the covering 12 taut, and maintains the covering and windshield assembly upright over the driver-receiving or hatch openings 11h in the front deck of the military tank 11 with the base of hatch cover 10 in contact with the upper outer surface of the deck 11e and plugs 11f, 11g bounding the said opening 11h. The means 25 comprises a plurality of separate endless inflatable tubes 26, 27, 28, each of polygonal configuration in plan with straight sides terminating in rounded corners at their junctions, secured to the flexible dependent side wall portions 22, 23 and the flexible back wall portion 24. The tubes 26, 27, 28 are not in communication with one another and may be inflatably distended with air as by a known type of bicycle pump, suitable valves 33 being provided for this purpose. Each inflatable tube 26, 27, 28 may be made of suitable textile fabric coated on one or both sides with, for example, a suitable rubber composition.

Figure 5:
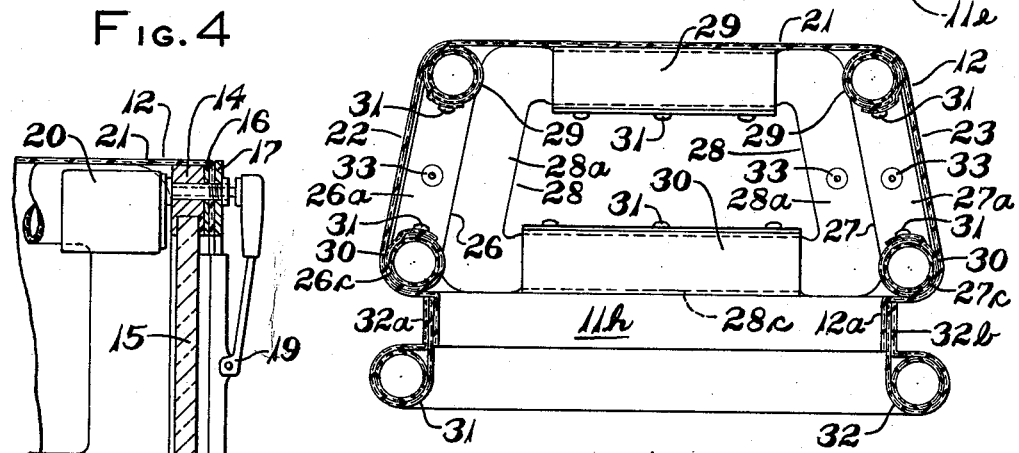
FIG. 5 is a sectional view of the inflatable hatch cover taken along 5—5 in FIG. 4, the front deck not being shown.

It is to be noted that the two endless side tubes 26, 27 are of rectangular configuration in plan, and extend the full length of and about the entire outer boundary or periphery of the rectangular dependent side walls or panels 22, 23 which flare toward the base of the hatch cover; consequently, the endless back tube 28 is of generally trapezoidal configuration in plan with parallel top and bottom sides and flared ends, and extends about the periphery of the back wall or panel 24 in the space between the two side tubes 26, 27 in bracing relation to such side tubes, as shown especially in FIG. 5. The generally vertically extending straight portions or reaches 28a, 28a of the back tube 28 contact and brace the adjacent generally vertically extending straight portions or reaches 26a, 27a of the side tubes 26, 27. The other generally vertically extending straight portions or reaches 26b, 27b of the side tubes 26, 27 contact and brace the ends of the windshield to maintain the latter upright. Each endless tube 26, 27, 28 has rounded corner portions at all the junctions of adjacent straight portions or reaches of the tube to make feasible the required localized bending of each tube and hence deflection of the hatch cover 10. The straight bottom reach or portion of each tube 26, 27, 28 constitutes an inflatable sill element thereby providing a plurality of separate inflatable sill elements 26c, 27c, 28c in series peripherally about the base of the hatch cover 10 for seating against the front deck 11e and plugs 11f, 11g of the tank.

Retainer means 29, 30 in the form of sleeves of flexible material such, for example, as suitable rubber coated textile fabric extend along and embrace the straight top and bottom portions or reaches, respectively, of each inflatable tube 26, 27, 28, but terminate adjacent the rounded corner portions of each inflatable tube, as shown especially in FIG. 5. The retainer means detachably connects the tubes to the dependent side and back wall portions or panels 22, 23, 24 of the flexible covering 12. Each of the fabric sleeves 29, 30 is longitudinally split and may be sewed and adhesively secured to the flexible covering. These split sleeves have flap portions for disposition in overlapping detachably secured relation to one another as by known snap fasteners 31 to facilitate replacement of a tube, when desired. The construction and arrangement securely holds the tubes, when inflated, in position and in supporting relation to the flexible covering 12 about the above-mentioned periphery or boundary of the dependent wall portions 22, 23, 24, and compels bending of the tubes locally in the rounded corner portions under the influence of external forces acting on the hatch cover.

The hatch cover 10 includes inflatable tubular attaching means 31 extending peripherally about and connected to the base of the hatch cover in underlying spaced relation thereto. The attaching means 31 is an endless inflatable tube made of suitable textile fabric coated on one or both sides with, for example, a suitable rubber composition. The endless inflatable tube 31 has a configuration in plan approximately corresponding to that of the hatch opening 11h, which configuration as shown especially in FIG. 4, is generally rectangular with spaced substantially parallel straight sides interconnected at the front by an arcuate side and interconnected at the back by a straight side. Thus, the endless inflatable tube 31 has straight side and back portions for underlying the corresponding straight margins of the hatch opening 11h and also the straight inflatable sill elements 26c, 27c, 28c of the inflatable tubular supporting means 25, but has an integral arcuate front portion for underlying the arcuate front margin of the front deck 11e at the hatch opening 11h.

The attaching tube 31 is connected in a flexible manner to the base of the hatch cover 10 to accommodate variation in the configuration of the hatch opening 11h and variation in thickness of the front deck including the side closure plugs 11f and 11g. The flexible connection may be accomplished by having the endless tube 31 entirely enclosed within a peripherally continuous sheath 32 of suitable textile fabric coated with, for example, a suitable rubber composition. This sheath is suitably folded around and adhered to the tube 31, and has upwardly projecting peripherally continuous flange portions 32a and 32b overlapping one another and also overlapping a downwardly extending peripherally continuous extension 12a of the flexible covering 12 of the hatch cover 10. The flange portions 32a and 32b and the extension 12a may be sewed together and adhered one to the other.

The flexible covering 12, as shown especially in FIG. 5, has its side wall portions 22, 23 and its back wall portion 24 extending about the bottom of the respective sill elements 26c, 27c, 28c and then continuing therefrom so as to form the major part of the peripheral extent of the extension 12a. The flexible covering 12 includes an integral front portion 12b suitably secured to the bottom of the windshield 13 and extending rearwardly therefrom and then downwardly to provide the remainder of the peripheral extent of the extension 12a adapted to conform to the arcuate front margin of the hatch opening 11h, as shown especially in FIGS. 4 and 6.

In the operation of the hatch cover 10, assuming the rigid metal hatch cover to be removed from the front deck 11e of the tank, the triangular side closure plugs 11f, 11g are first secured in place to define the generally rectangular hatch opening 11h. Next, the inflatable hatch cover 10 in its deflated condition is positioned over the hatch opening 11h such that the rigid windshield 13 extends laterally with the bottom of the windshield seated against the upper surface of the front arcuate margin of the hatch opening 11h, while the sill elements 26c, 27c, 28c of the inflatable tubular supporting means 25 extend along the straight side and back margins of the hatch opening 11h and rest upon the upper surface thereof. The peripherally continuous extension 12a of the flexible covering 12 together with the peripherally continuous flange portions 32a and 32b of the sheath 32 are disposed about the vertical surface of the margin of the hatch opening 11h. This results in the endless inflatable tube 31 extending peripherally about the base of the hatch cover 10 in underlying spaced relation thereto and adjacent the lower surface of the margin bounding the hatch opening 11h.

The separate endless inflatable tubes 26, 27, 28 of the inflatable tubular supporting means 25 are then individually inflated by the manual operation of the bicycle pump until the internal air pressure is in the order of ½ lb. to 1 lb. per square inch gauge pressure.

The inflation of the tubes 26, 27, 28 compels the flexible covering 12 to assume its upright position over the hatch opening 11f as shown in the drawings, while at the same time the windshield 13 assumes its vertical position. The hatch cover 10 is then removably attached by inflating the endless tube 31 to a suitable internal air pressure as by operation of the bicycle pump. This effectively clamps the margin of the front deck bounding the hatch opening 11h between the peripheral base of the inflated hatch cover 10 including its sill elements and the inflated endless tube 31. The mounted hatch cover 10 is capable of withstanding winds of relatively high velocity without being blown away, yet readily accommodates the head and upper part of the torso of the driver of the tank, while protecting the latter against low temperatures, rain, snow, sleet and other inclement weather conditions. Nevertheless, the hatch cover 10 can be quickly and conveniently removed from over the hatch opening 11h by deflating the respective tubes 26, 27, 28 of the inflatable tubular supporting means 25 and the inflatable tube 31 of the inflatable tubular attaching means.

Figure 1:
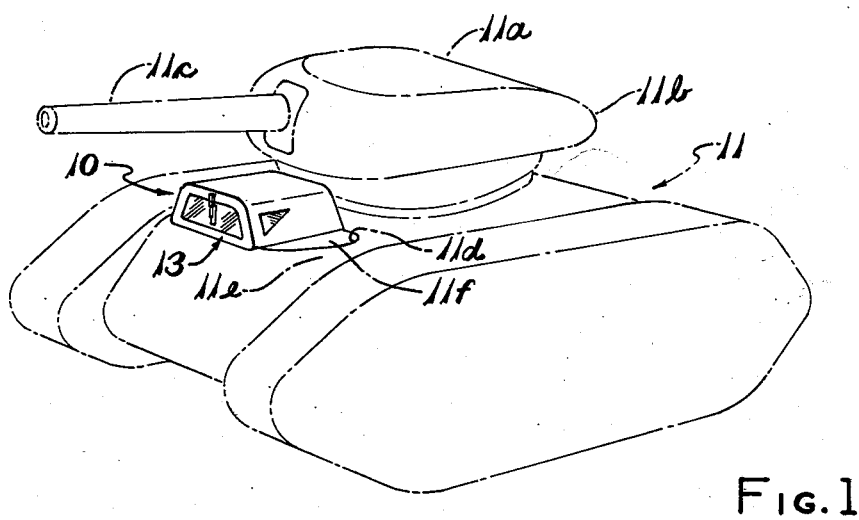
FIG. 1 is a view of an inflatable hatch cover or hood constructed and arranged in accordance with the invention and mounted upright on the front deck of a military tank, broken lines showing other components of the tank.

An important feature of the hatch cover in its mounted condition is the provision for deflection and alteration of the normal shape and height of the hatch cover 10 without permanently damaging or destroying the latter. This makes feasible a hatch cover of practical dimensions for military tank purposes even though the fully depressed gun 11c during its sweep back and forth across the tank can strike against the respective flared ends and upper rounded corners of the upright windshield 13. The hatch cover 10 is generally located closely adjacent the gun turret 11a as shown in FIG. 1, so that the overall height of the hatch cover necessarily results in inherent interference of the hatch cover 10 and the fully depressed gun 11c.

Assuming the gun turret 11a is rotated in a manner to sweep the fully depressed gun 11c from one side of the hatch cover 10 to the other side thereof, the gun 11c first strikes against the upper part of a flared end of the windshield 13, whereby the rounded outer surface of the gun 11c causes the upright windshield to swing pivotally about its bottom in the direction toward the turret 11a and the front deck 11e. The adjacent rounded upper corner of the windshield 13 performs the important function of a camming surface, while in contact with the rounded outer surface of the gun, to further assure a downwardly and rearwardly inclined disposition of the windshield. As the gun 11c continues its traverse to a point beyond the windshield 13, the latter is temporarily maintained in the said inclined disposition.

The pivoting movement of the windshield 13 toward the rear of the hatch cover 10 is yieldably resisted by the inherent stiffness of the inflated tubes 26, 27, 28. However, the external force applied by the fully depressed gun is sufficient to induce limited bending of the inflated tubes especially at their relatively unrestrained rounded corner portions thereby accommodating the temporary downward inclination of the windshield. In this manner, the hatch cover is deflected and its normal shape temporarily altered sufficiently to permit traverse of the fully depressed gun without damage to the hatch cover. However, so soon as the application of the external force ceases, the inflated tubes 26, 27, 28 resume their normal shape and disposition, thereby quickly restoring the windshield 13 to its substantially vertical position and restoring the flexible cover 12 to its normal shape and configuration together with again providing the desired tautness of the flexible dependent wall portions 22, 23, 24 and the roof portion 21.

It is to be noted that the hatch cover 10 can also be bumped by the bustle 11b when the gun turret 11a is rotated sufficiently to point the gun to the rear of the tank. The bustle 11b strikes against and hence applies external force to the upper part of the flexible back wall 24 of the hatch cover 10 thereby causing deflection of the latter. Such deflection of the hatch cover is accommodated by virtue of the inflated tubes 26, 27, 28 bending locally, particularly at their rounded corner portions so that temporary alteration of the normal shape of the hatch cover 10 occurs. The normal shape is resumed so soon as the bustle passes beyond the hatch cover 10.

Since the bustle rubs against and abrades the upper part of the back wall 24, the service life of the hatch cover may be increased by providing the back wall 24 with increased thickness of rubber at its outer surface or, if desired, with an additional layer of suitable rubberized fabric adhered to the upper part of the back wall 24.

It is noteworthy that the invention provides an inflatable hatch cover which is essentially universal in its applicability to various models of tanks having different size hatch openings. Also, the inflatable hatch cover together with its attaching means does not require close tolerances of the dimensions of the hatch opening to which it is fitted nor close tolerances in the thickness of the front deck margin bounding the hatch opening over which the hatch cover is mounted upright to protect the driver.

Variations may be made without departing from the scope of the invention as it is defined in the following claims.

I claim:
1. A collapsible removable shelter for mounting upright over an opening in a vehicle body, said shelter comprising:
   (a) a windshield of transparent material at the front of the shelter,
   (b) a covering of flexible foldable fabric providing a roof portion and dependent wall portions of the shelter attached to the top and opposite sides of the windshield, and said covering providing with said windshield a configuration in plan of the shelter approximately corresponding to the configuration of the vehicle opening,
   (c) inflatable tubes disposed in supporting relation to the said roof and dependent wall portions of the covering and to each of said sides of the windshield, said tubes being inflatable to maintain the covering and windshield upright over the vehicle opening with the peripheral base of the shelter including the bottom of said windshield seated against an upper marginal surface of the vehicle body bounding said opening therein,
   (d) means for admitting a fluid medium under pressure to said tubes and for exhausting the fluid medium therefrom, said pressure being sufficiently low to permit said tubes to yield and bend locally in response to external applied force,
   (e) and flexible attaching means connected to said base of the shelter in underlying relation thereto for engaging a lower marginal surface of the vehicle body bounding said opening therein to detachably secure the shelter in its upright position over said opening and to the vehicle.

2. A collapsible removable shelter as defined in claim 1 in which:
   (a) said covering comprises flexible foldable fluid-tight fabric material providing integral roof and dependent wall portions of the shelter detachably secured in fluid-tight relation to the top and opposite sides of the windshield,
   (b) said inflatable tubes include an inflatable tubular sill extending about the said peripheral base of said shelter,
   (c) and said attaching means comprises inflatable tubular attaching means extending peripherally about and flexibly connected to said base of the shelter in underlying spaced relation thereto,
   (d) and means for admitting a fluid medium under pressure to said attaching means and for exhausting the fluid medium therefrom.

3. A collapsible removable shelter as defined in claim 1 in which:
   (a) said covering provides with said windshield a generally rectangular configuration in plan, the said roof portion of said covering being flat and said dependent wall portions of said covering constituting a back wall and spaced opposite side walls of the hatch cover extending rearwardly from said sides of the windshield and connected to said back wall, and
   (b) said inflatable tubes comprise separate non-communicating endless inflatable tubes each of which extends about the boundary of a dependent wall portion to support the latter and has straight reaches interconnected at each junction of adjacent reaches by a rounded corner portion of the tube to permit bending of the tube, when inflated, so that the hatch cover can be deflected by the application of an external force thereto.

4. A collapsible removable shelter as defined in claim 1 in which:
   (a) said windshield has rounded corners at the junction of its top with said opposite sides, said rounded corners constituting camming surfaces for contacting an object such as a gun barrel of the vehicle during traverse of the gun in its fully depressed position, thereby causing deflection of the shelter,
   (b) said covering providing with said windshield a shelter of generally rectangular configuration in plan and of lesser height than length and width, and said dependent wall portions of the covering providing flexible side walls interconnected by a flexible back wall with said side walls flaring from said roof portion toward said peripheral base of the hatch cover, and
   (c) said inflatable tubes comprising a plurality of endless inflatable tubes detachably secured to said covering at said side walls and back wall thereof, each tube having straight reaches interconnected at the junctions of adjacent reaches by rounded corner portions adapted to bend, when inflated, to permit the said deflection of the hatch cover.

References Cited in the file of this patent
UNITED STATES PATENTS

| 2,716,529 | Czerwinski | Aug. 30, 1955 |
| 2,871,763 | Blomquist | Feb. 3, 1959 |
| 3,064,725 | Roark | Nov. 20, 1962 |